Aug. 3, 1954     E. C. MILLER     2,685,649
ANALYZER

Filed Oct. 29, 1952     2 Sheets-Sheet 1

INVENTOR.
E. C. Miller
BY
Hudson & Young
ATTORNEYS

Aug. 3, 1954  E. C. MILLER  2,685,649
ANALYZER
Filed Oct. 29, 1952  2 Sheets-Sheet 2

INVENTOR.
E. C. Miller
BY
Hudson & Young
ATTORNEYS

Patented Aug. 3, 1954

2,685,649

UNITED STATES PATENT OFFICE 2,685,649

ANALYZER

Elmer C. Miller, Bartlesville, Okla., assignor to Phillips Petroleum Company, a corporation of Delaware Application October 29, 1952, Serial No. 317,548

9 Claims. (Cl. 250—43.5)

This invention relates to a method of and apparatus for detecting the presence of carbon dioxide. In another aspect it relates to a filter system for use in a double beam infrared analyzer.

In the production of butadiene by dehydrogenation of normal butylenes over a catalyst, it has been discovered that it is of considerable importance, both from economic and production viewpoints, to maintain the catalyst at a high degree of activity. The most important factor in this respect appears to be the catalyst regeneration. For optimum efficiency of operation the regeneration must be consistent from cycle to cycle and as thorough as the factors of burnout time and and oxygen content will permit. During the greater part of the regeneration cycle temperature measurements may be used as a guide for correct burnout conditions; however, near the end of the cycle a more sensitive method is needed. In this regard it has been proposed to measure the carbon dioxide content of the effluent regeneration gas since it has been established that such carbon dioxide content affords a reliable indication of the completeness of the regeneration of the catalyst. One method of making such an analysis that has been proposed is by a routine Orsat procedure. Obviously such a procedure is neither desirable nor practical because of the time involved and because the results obtained are intermittent rather than continuous.

It is toward providing an analyzer, continuous in operation, adapted to detect the presence and concentration of carbon dioxide, that the present invention is primarily directed. In order to employ such an analyzer to detect the presence of carbon dioxide in the effluent gases of the catalyst regeneration above described, it is necessary that the analyzer be capable of detecting carbon dioxide in the possible presence of nitrogen, oxygen, and water vapor. The analyzer of this invention is based upon the property of certain heteratomic molecules to absorb infrared radiation of wave lengths characteristic of the particular molecule. The intensities of radiation of two infrared beams emitted from a common source are compared by means of temperature sensitive resistance elements forming arms of an electrical bridge circuit. Both of the beams pass through a common sample cell containing the material under analysis and also through suitable filters to limit the total radiation transmitted to a rather narrow band of selected wave lengths. One of the beams is transmitted through a plate of quartz which limits the transmitted radiation to wave lengths up to and slightly longer than one of the principal absorption bands of carbon dioxide. The second beam is transmitted through either a plate of sapphire or a plate of quartz, the latter being somewhat thicker than the plate of quartz in the first beam. Either of these second mentioned plates limits the transmitted radiation to wave lengths shorter than the previously mentioned absorption band of carbon dioxide. In this manner a comparison of the intensities of the two resulting beams provides a direct indication of the concentration of the carbon dioxide in the sample cell provided the stream under analysis does not contain other components having appreciable absorption bands in the selected isolated band of wave lengths.

Accordingly, it is an object of this invention to provide a method of detecting the presence of carbon dioxide in a fluid sample which may contain nitrogen oxygen, and water vapor.

Another object is to provide apparatus for continuously analyzing a sample stream to detect carbon dioxide present therein.

A further object is to provide an optical filter system for an infrared analyzer adapted to detect carbon dioxide.

Various other objects, advantages and features of this invention should become apparent from the following detailed description taken in conjunction with the accompanying drawing in which.

Figure 1:
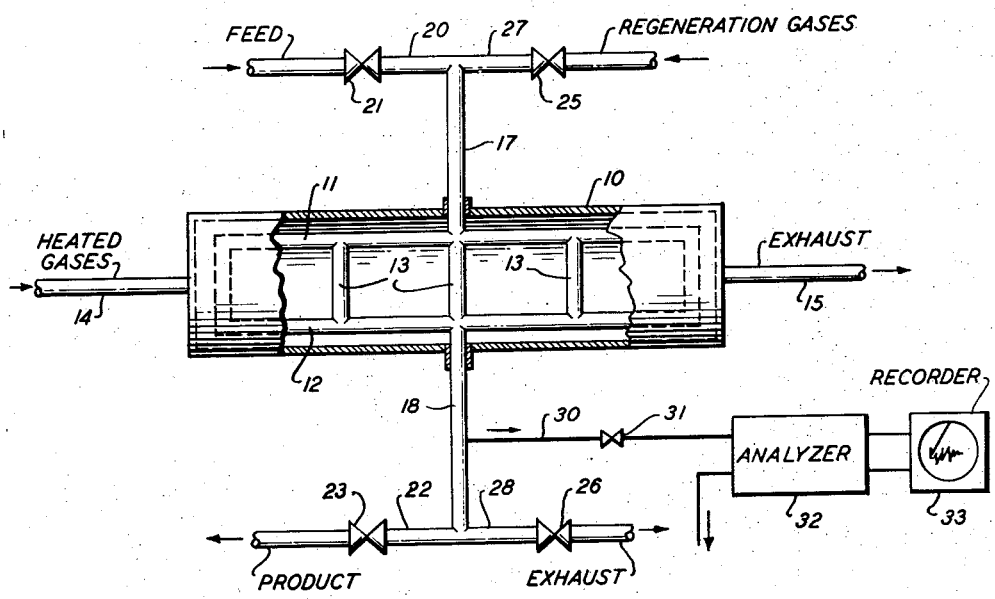
Figure 1 is a schematic representation of apparatus employed to analyze a sample stream of effluent gas from a catalyst regenerator.

Referring now to the drawing in detail and to Figure 1 in particular there is shown a schematic representation of a dehydrogenation chamber 10 which comprises an inlet header 11 and an outlet header 12 interconnected by a plurality of tubes 13 which are filled with a suitable dehydrogenation catalyst. Gases at an elevated temperature enter chamber 10 through a line 14 to heat tubes 13 and are exhausted through a line 15. An inlet line 17 communicates with header 11 and an outlet line 18 communicates with header 12. In operation, a feed stream comprising normal butylenes is passed through a line 20 having a valve 21 therein into line 17, and thence through tubes 13 in chamber 10 and finally out through line 18 into a product line 22 having a valve 23 therein. The product stream contains butadiene. After a run of approximately one hour it is necessary to regenerate the catalyst in tubes 13. This is accomplished by closing valves 21 and 23 and opening valves 25 and 26 in respective lines 27 and 28 which communicate with respective lines 17 and 18. Catalyst regeneration gases comprising air and steam are then circulated through the system, and a sample stream of such exhaust gases is removed from line 18 through a line 30 having a valve 31 therein. This sample stream is circulated through an analyzer 32, the output signal of which is applied to a recorder 33. Analyzer 32 is designed to determine the concentration of carbon dioxide in the exhaust regeneration gases, which in turn provides an accurate indication of the completeness of the regeneration of the catalyst.

Figure 2:
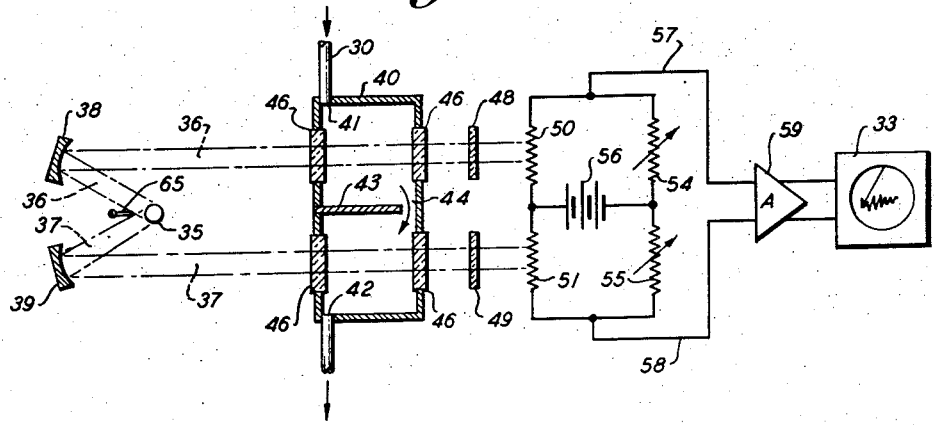
Figure 2 is a schematic view of an analyzer including the optical filter system.

As shown in greater detail in Figure 2, analyzer 32 comprises a source of infrared radiation 35, which can be a heated Nichrome wire, from which two beams of radiation 36 and 37 are directed against a pair of respective front surface concave reflectors 38 and 39. The radiation beams are directed by these reflectors through a common sample cell 40 having an inlet opening 41 connected to line 30 and having an outlet opening 42. Cell 40 preferably is divided by a partition 43 having an opening 44 positioned at the opposite end of the cell from the inlet and outlet openings. This assures continuous circulation of the sample stream throughout the cell. Cell 40 is provided with thin calcium fluoride windows 46 which are transparent to infrared radiation at wave lengths corresponding to the absorption bands of interest of carbon dioxide. Radiation beams 36 and 37 pass through common cell 40 and through respective filters 48 and 49 to impinge upon respective temperature sensitive electrical resistance elements 50 and 51. Filter 48 is formed of quartz and filter 49 is formed of either sapphire or quartz, in the latter case filter 49 is thinner than filter 48. Elements 50 and 51 can be thermistors having a high temperature coefficient of thermal resistivity, for example, bolometers, such that radiation impinging upon the elements produces changes in their electrical resistivity. With the apparatus arranged as described, differences of resistance of the two elements 50 and 51 are representative of the concentration of carbon dioxide in the sample stream circulated through cell 40.

Elements 50 and 51 are connected in a Wheatstone bridge circuit with balancing variable resistors 54 and 55. A source of voltage 56 is connected across first opposite terminals of the bridge circuit, and output leads 57 and 58 are connected to the second pair of opposite terminals of the bridge circuit. Leads 57 and 58 are connected to the input terminals of an amplifier 59, the output of which is applied to recorder 33. The bridge circuit is initially balanced with no carbon dioxide or with a known quantity of carbon dioxide present in cell 40. This balance is obtained by adjustment of resistors 54 and 55 and/or by rotation of a trimmer 65 which comprises a small opaque vane rotatable into either of radiation beams 36 or 37 to reduce the intensity thereof. Thus any change in concentration of carbon dioxide in the sample passed through cell 40 results in unbalance of the bridge circuit due to the change in amount of radiation absorbed by the carbon dioxide. The potential difference between leads 57 and 58 representing this unbalance is amplified and recorded.

As an example of the preferred embodiment of this invention, satisfactory results have been obtained with an analyzer employing a sample cell 40 approximately 15 centimeters long with calcium fluoride windows 46 approximately 1.5 millimeters thick. Both quartz filter 48 and sapphire filter 49 were approximately 4.0 millimeters thick.

Figure 3:
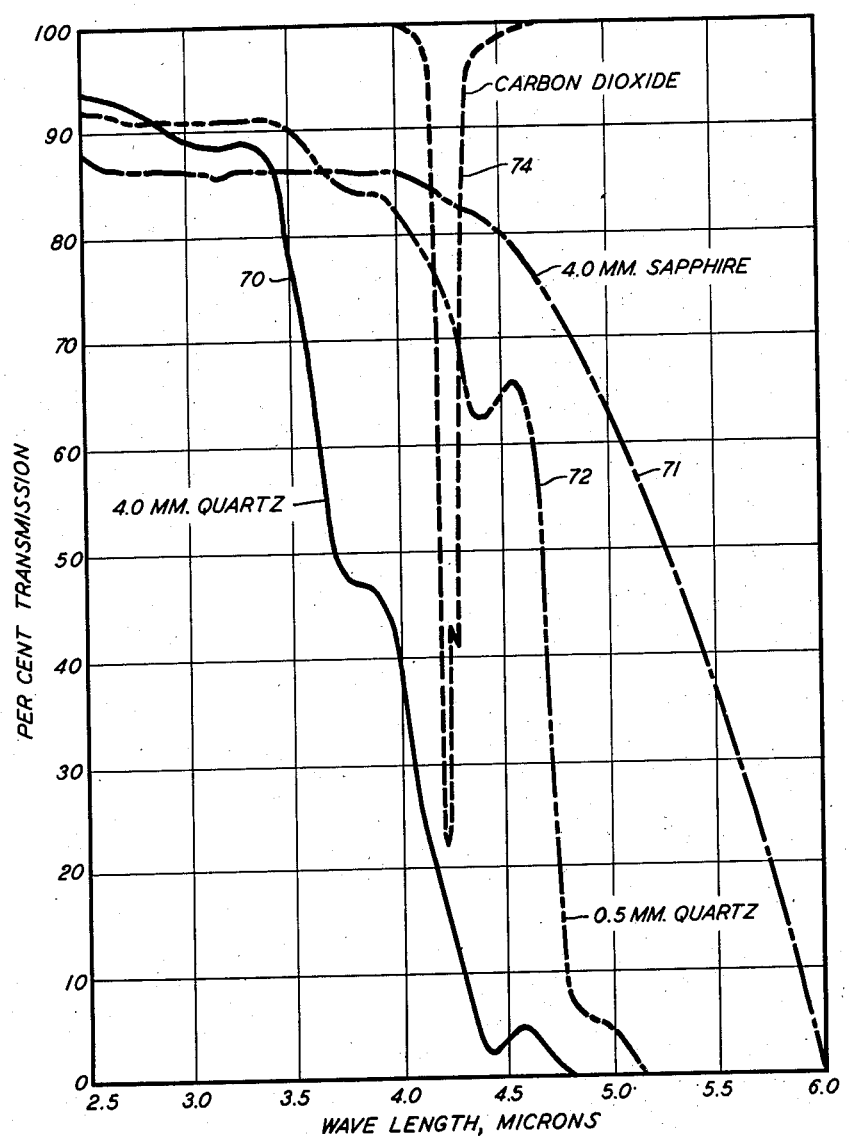
Figure 3 illustrates infrared absorption characteristics of selected materials.

The operation of the filter system of this invention which enables the analyzer to detect carbon dioxide in the possible presence of nitrogen, oxygen, and water vapor can best be explained in conjunction with Figure 3. The curves of Figure 3 represent the per cent transmission of infrared radiation of various wave lengths passed through selected materials. Curve 70 represents the transmission characteristics of a plate of quartz 4.0 millimeters thick; curve 71 represents the transmission characteristics of a plate of sapphire 4.0 millimeters thick; and curve 72 represents the transmission characteristics of a plate of quartz 0.5 millimeters thick. Curve 74 represents one of the principal absorption bands of a pure sample of carbon dioxide. From an inspection of these curves it can be seen that carbon dioxide has an absorption band at approximately 4.25 microns. The 4.0 millimeter quartz plate transmits practically no radiation beyond approximately four microns whereas the 4.0 millimeter sapphire plate transmits radiation of wave lengths up to approximately six microns. Although not shown in Figure 3, calcium fluoride transmits infrared radiation of wave lengths up to approximately eight microns. Thus with sample cell 40 empty, the quantity of radiation impinging upon element 70 is represented by the area under curve 70 if filter 48 comprises a plate of quartz 4.0 millimeters thick. The quantity of radiation impinging upon element 51 is represented by the area under curve 71. This results in a difference in total radiation impinging upon elements 50 and 51 as represented by the difference in areas under the two curves 70 and 71.

If the sample stream circulated through cell 40 contains carbon dioxide, the total quantity of radiation impinging upon element 51 is reduced by the amount of radiation absorbed by the carbon dioxide in the sample stream. The larger the percentage of carbon dioxide present, the greater the reduction in radiation transmitted. However, the presence of carbon dioxide in cell 40 does not affect the quantity of radiation transmitted to element 50 because the radiation at wave lengths corresponding to the indicated absorption band of carbon dioxide already is absorbed by quartz filter 48. Thus any change in concentration of carbon dioxide in cell 40 results in a change in the differential intensity of total radiation impinging upon elements 50 and 51. This change in radiation is indicated on recorder 33 as previously described.

Approximately the same results are realized if sapphire filter 49 is replaced by a quartz filter having a thickness of approximately 0.5 millimeters. From an inspection of Figure 3, it can be seen that such a quartz filter transmits radiation of wave lengths up to approximately five microns. A thin quartz filter employed in concert with a thicker quartz filter thus isolates a region at wave lengths corresponding to the absorption band of carbon dioxide.

From the foregoing description of a preferred embodiment of this invention it should be apparent that there has been provided a filter arrangement for use with an infrared analyzer whereby carbon dioxide can be detected. While this filter system has been described in conjunction with a simple Wheatstone bridge measuring circuit, it should be apparent that various other systems can be employed to measure and compare the intensities of radiation of the two beams. One such system comprising a self-balancing bridge circuit with automatic standardization is disclosed in U. S. Patent 2,579,825. Another alternative is to employ a pair of sensitive thermocouples as the detecting elements. It should also be apparent that the output electrical signal can be employed to control the length of the regeneration cycle in the example described in Figure 1 or such signal can be used to control any other suitable process variable affecting concentration of carbon dioxide in any system wherein it may be desired to detect carbon dioxide. Accordingly, it is not intended that this invention be limited to the preferred embodiments herein illustrated since various modifications obviously can be made by those skilled in the art.

What is claimed is:

1. The method of detecting the presence of carbon dioxide which comprises establishing two beams of infrared radiation of predetermined intensity, directing both of said beams through a sample of material under analysis, directing one of said beams through a quartz filter of sufficient thickness to absorb a major portion of the total radiation in said one beam of wave lengths longer than approximately 4.25 microns, directing the other of said beams through filter means to transmit a predetermined quantity of radiation of wave lengths longer than approximately 4.25 microns, the transmitted radiation of said other beam of wave lengths longer than approximately 4.25 microns being greater than the radiation of wave lengths longer than approximately 4.25 microns transmitted through said quartz filter, and measuring the resulting intensities of the two beams whereby changes in the ratio of intensities is indicative of changes in concentration of carbon dioxide present in the material under analysis.

2. The method of detecting the presence of carbon dioxide in a sample stream containing oxygen, nitrogen, and water vapor which comprises establishing two beams of infrared radiation of predetermined intensity, directing both of said beams through such a sample stream, directing one of said beams through a quartz filter of sufficient thickness to absorb a major portion of the total radiation in said one beam of wave lengths longer than the wave lengths of the absorption band of carbon dioxide which occurs at approximately 4.25 microns, directing the other of said beams through a sapphire filter of sufficient thickness to allow a predetermined quantity of radiation longer than the wave lengths of the absorption band of carbon dioxide which occurs at approximately 4.25 microns to be transmitted, the transmitted radiation of said other beam of wave lengths longer than approximately 4.25 microns being greater than the radiation of wave lengths longer than approximately 4.25 microns transmitted through said quartz filter, and measuring the resulting intensities of the two beams whereby changes in the ratio of intensities is indicative of changes in concentration of carbon dioxide present in the sample stream under analysis.

3. An analyzer adapted to detect the presence of carbon dioxide comprising a sample cell adapted to contain a sample of material under analysis, a source of infrared radiation, means to direct two beams of radiation from said source through said sample cell, a quartz filter disposed in one of said beams, said quartz filter being of sufficient thickness to absorb a major portion of the total radiation in one said beam of wave lengths longer than the wave lengths of the absorption band of carbon dioxide which occurs at approximately 4.25 microns, filter means disposed in the other of said beams to transmit a predetermined quantity of radiation of wave lengths longer than the wave lengths of the absorption band of carbon dioxide which occurs at approximately 4.25 microns, the transmitted radiation of said other beam of wave lengths longer than approximately 4.25 microns being greater than the radiation of wave lengths longer than approximately 4.25 microns transmitted through said quartz filter, and radiation detecting means to measure the resulting intensities of said beams whereby changes in the ratio of intensities is indicative of changes in concentration of carbon dioxide present in the sample cell.

4. An analyzer to detect the presence of carbon dioxide comprising a sample cell having inlet and outlet means whereby a fluid stream under analysis can be circulated therethrough, said cell being provided with calcium fluoride windows, a source of infrared radiation, means to direct two beams of radiation from said source through said sample cell, a quartz filter disposed in one of said beams, said filter being of sufficient thickness to absorb a major portion of the total radiation of wave lengths longer than the wave lengths of the absorption band of carbon dioxide which occurs at approximately 4.25 microns, filter means disposed in the other of said beams to transmit a predetermined quantity of radiation of wave lengths longer than the wave lengths of the absorption band of carbon dioxide which occurs at approximately 4.25 microns, the transmitted radiation of said other beam of wave lengths longer than approximately 4.25 microns being greater than the radiation of wave lengths longer than approximately 4.25 microns transmitted through said quartz filter, and radiation detecting means to measure the resulting intensities of said beams whereby changes in the ratio of intensities is indicative of changes in concentration of carbon dioxide present in the sample cell.

5. The combination in accordance with claim 4 wherein said filter means comprises a sapphire filter.

6. The combination in accordance with claim 4 wherein said filter means comprises a quartz filter substantially thinner than said first mentioned quartz filter.

7. An analyzer adapted to detect the presence of carbon dioxide comprising a sample cell having inlet and outlet means whereby a fluid stream under analysis can be circulated therethrough, said cell being provided with calcium fluoride windows, a source of infrared radiation, means to direct two beams of radiation from said source through said sample cell, a sapphire filter disposed in one of said beams, a quartz filter disposed in the other of said beams, a thermal sensitive resistance element disposed in each resulting beam of radiation, said resistance elements being connected in a Wheatstone bridge circuit to detect changes in the ratio of the intensities of radiation impinging upon the two resistance elements.

8. The combination in accordance with claim 7 wherein said sample cell is approximately 15 centimeters long, said quartz filter is approximately 4.0 millimeters thick, and said sapphire filter is approximately 4.0 millimeters thick.

9. The method of detecting the presence of carbon dioxide which comprises establishing two beams of infrared radiation of predetermined intensity, directing both of said beams through a sample of material under analysis, directing one of said beams through filter means to absorb a major portion of the total radiation in said one beam of wave lengths longer than the wave lengths of the absorption band of carbon dioxide which occurs at approximately 4.25 microns, directing the other of said beams through filter means to transmit a predetermined quantity of radiation of wave lengths longer than the wave lengths of the absorption band of carbon dioxide which occurs at approximately 4.25 microns, the transmitted radiation of said other beam of wave lengths longer than approximately 4.25 microns being greater than the radiation of wave lengths longer than approximately 4.25 microns transmitted through said first-mentioned filter means, and comparing the resulting intensities of the two beams whereby changes in the ratio of intensities are indicative of the changes in concentration of carbon dioxide present in the material under analysis.

References Cited in the file of this patent

UNITED STATES PATENTS

| Number | Name | Date |
|---|---|---|
| 2,579,825 | Hutchins | Dec. 25, 1951 |
| 2,621,297 | Obermaier | Dec. 9, 1952 |